(12) United States Patent
Kaiser

(10) Patent No.: US 9,493,655 B2
(45) Date of Patent: Nov. 15, 2016

(54) COMPOSITION FOR FILLING JOINTS AND/OR CRACKS

(71) Applicant: DENSO-Holding GmbH & Co., Leverkusen (DE)

(72) Inventor: Thomas Markus Kaiser, Inden (DE)

(73) Assignee: Denso-Holding GmbH & Co., Leverkusen (DE)

( * ) Notice: Subject to any disclaimer, the term of this patent is extended or adjusted under 35 U.S.C. 154(b) by 0 days.

(21) Appl. No.: 14/784,619

(22) PCT Filed: Apr. 17, 2014

(86) PCT No.: PCT/EP2014/001036
§ 371 (c)(1),
(2) Date: Oct. 15, 2015

(87) PCT Pub. No.: WO2014/173513
PCT Pub. Date: Oct. 30, 2014

(65) Prior Publication Data
US 2016/0075877 A1 Mar. 17, 2016

(30) Foreign Application Priority Data
Apr. 22, 2013 (DE) .................. 10 2013 006 848

(51) Int. Cl.
| | |
|---|---|
| *C08L 95/00* | (2006.01) |
| *F16J 15/02* | (2006.01) |
| *C08L 7/00* | (2006.01) |
| *C08L 9/06* | (2006.01) |
| *C08L 17/00* | (2006.01) |
| *C04B 20/10* | (2006.01) |
| *C04B 26/26* | (2006.01) |
| *B29C 47/00* | (2006.01) |
| *B29C 47/30* | (2006.01) |
| *B29C 47/40* | (2006.01) |
| *B29C 47/92* | (2006.01) |
| *E01C 23/09* | (2006.01) |
| *C08L 1/02* | (2006.01) |
| *C08L 23/02* | (2006.01) |
| *C08L 53/02* | (2006.01) |
| *C04B 111/00* | (2006.01) |
| *C04B 111/34* | (2006.01) |
| *B29C 47/08* | (2006.01) |

(52) U.S. Cl.
CPC ............ *C08L 95/00* (2013.01); *B29C 47/0002* (2013.01); *B29C 47/30* (2013.01); *B29C 47/402* (2013.01); *B29C 47/92* (2013.01); *C04B 20/1014* (2013.01); *C04B 26/26* (2013.01); *C08L 7/00* (2013.01); *C08L 9/06* (2013.01); *C08L 17/00* (2013.01); *E01C 23/0973* (2013.01); *F16J 15/02* (2013.01); *B29C 47/0898* (2013.01); *B29C 2947/92704* (2013.01); *C04B 2111/00129* (2013.01); *C04B 2111/34* (2013.01); *C08L 1/02* (2013.01); *C08L 23/025* (2013.01); *C08L 53/02* (2013.01); *C08L 2205/03* (2013.01); *C08L 2205/035* (2013.01); *C08L 2205/16* (2013.01); *C08L 2555/52* (2013.01); *C08L 2555/82* (2013.01); *C08L 2555/84* (2013.01); *C08L 2555/86* (2013.01); *Y02W 30/97* (2015.05)

(58) Field of Classification Search
CPC ................ C08L 95/00; C08L 2205/035; C08L 2205/16; C08L 2555/84; C08L 2555/82
See application file for complete search history.

(56) References Cited

U.S. PATENT DOCUMENTS

| | | | | |
|---|---|---|---|---|
| 4,450,200 A | * | 5/1984 | Iwato ........................ | C08K 3/30 428/323 |
| 4,839,404 A | | 6/1989 | Chang et al. | |

(Continued)

FOREIGN PATENT DOCUMENTS

| | | | | |
|---|---|---|---|---|
| DE | 4 416 567 | * | 11/1995 | .............. C08L 95/00 |
| DE | 4416567 A1 | | 11/1995 | |

(Continued)

OTHER PUBLICATIONS

International Search Report and Written Opinion for PCT/EP2014/001036 dated Jul. 24, 2014 (9 pages).

(Continued)

*Primary Examiner* — Robert Harlan

(74) *Attorney, Agent, or Firm* — Bejin Bieneman PLC

(57) ABSTRACT

A composition comprises a quantity in the range of about 2.5% by weight to about 22% by weight of at least one elastomer selected from a group consisting of styrene-butadiene copolymers, styrene-butadiene-styrene (block) copolymers, styrene-isoprene (block) copolymers and/or styrene-isoprene-styrene (block) copolymers, synthetic and/or natural rubbers; a quantity in the range of about 12% by weight to about 35% by weight of at least one pulverulent mineral filler; a quantity in the range of about 0.5% by weight to about 5% by weight of at least one fibrous anti-flow additive to adjust strength, selected from the group consisting of cellulose, glass fibers and/or synthetic fibers; and a quantity in the range of about 0.1% by weight to about 8% by weight of at least one polymer produced from an olefin and from an α, β-unsaturated carboxylic acid and/or α,β-unsaturated carboxylic anhydride, where each of the percentages by weight is based on the entire quantity of the composition.

16 Claims, 6 Drawing Sheets

(56) References Cited

U.S. PATENT DOCUMENTS

| | | | | |
|---|---|---|---|---|
| 5,004,772 A | * | 4/1991 | Grzybowski | ........... C08L 95/00 |
| | | | | 524/62 |
| 2013/0116364 A1 | * | 5/2013 | Butz | ........................ C08J 3/128 |
| | | | | 524/71 |

FOREIGN PATENT DOCUMENTS

| | | | |
|---|---|---|---|
| DE | 10326161 A1 | 12/2004 | |
| EP | 0646675 B1 | 2/1998 | |
| EP | 2557230 A2 | 2/2013 | |
| JP | EP 2 557 230 A2 * | 2/2013 | .............. E01C 11/10 |
| WO | 9837146 A1 | 8/1998 | |
| WO | 2014173513 A1 | 10/2014 | |

OTHER PUBLICATIONS

Notification of Transmittal of Translation of the International Preliminary Report on Patentability for PCT/EP2014/001036 issued Oct. 27, 2015 (6 pages).

* cited by examiner

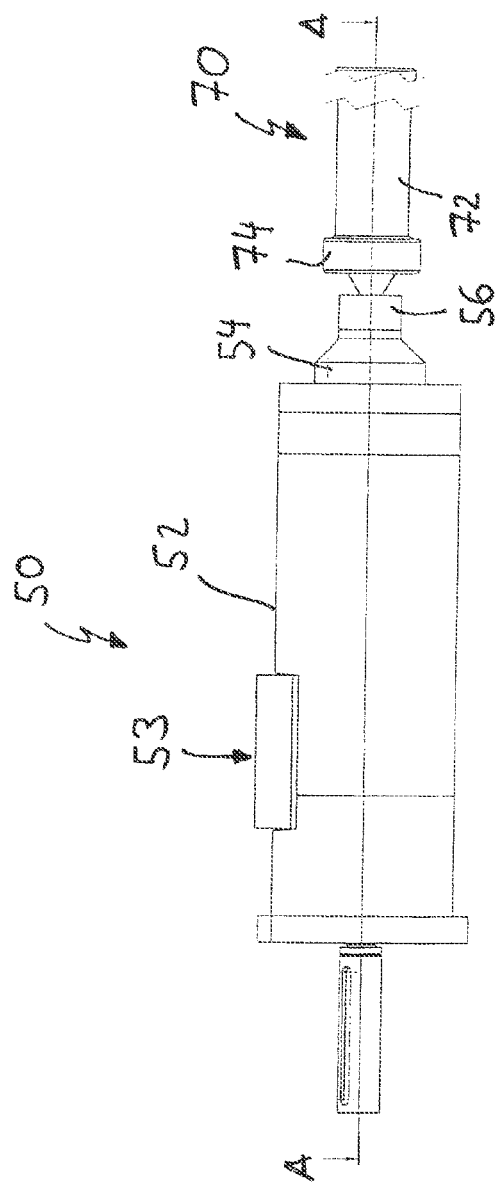
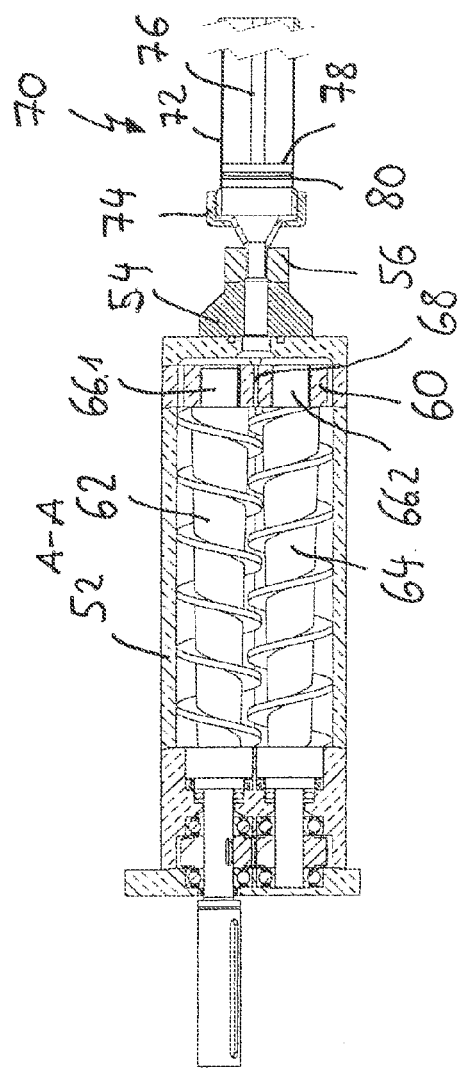
Fig. 5
Fig. 6

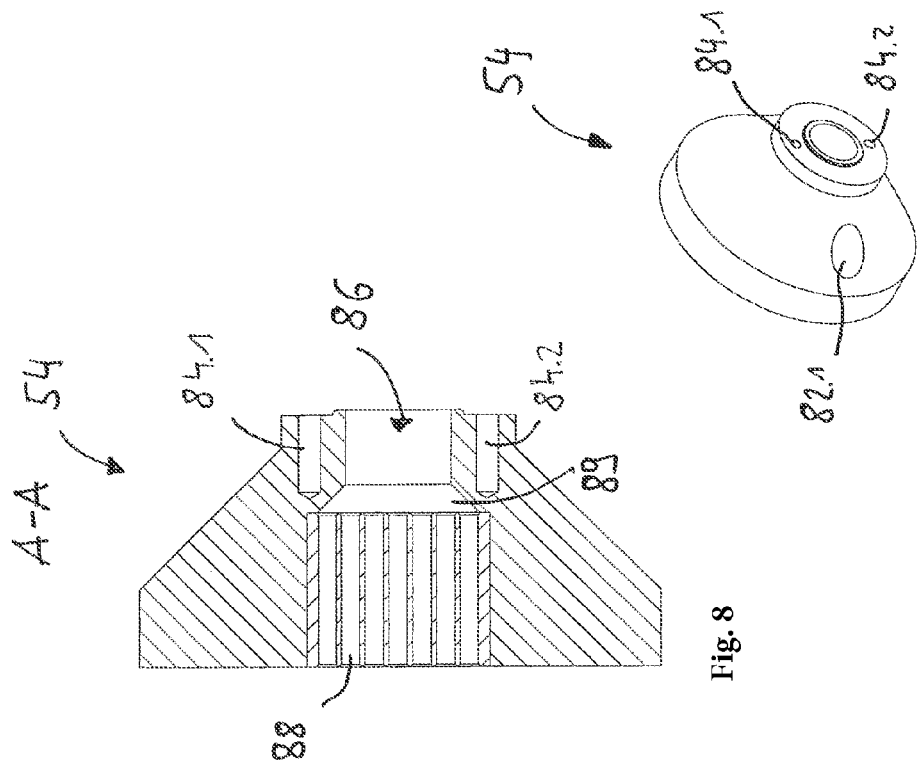
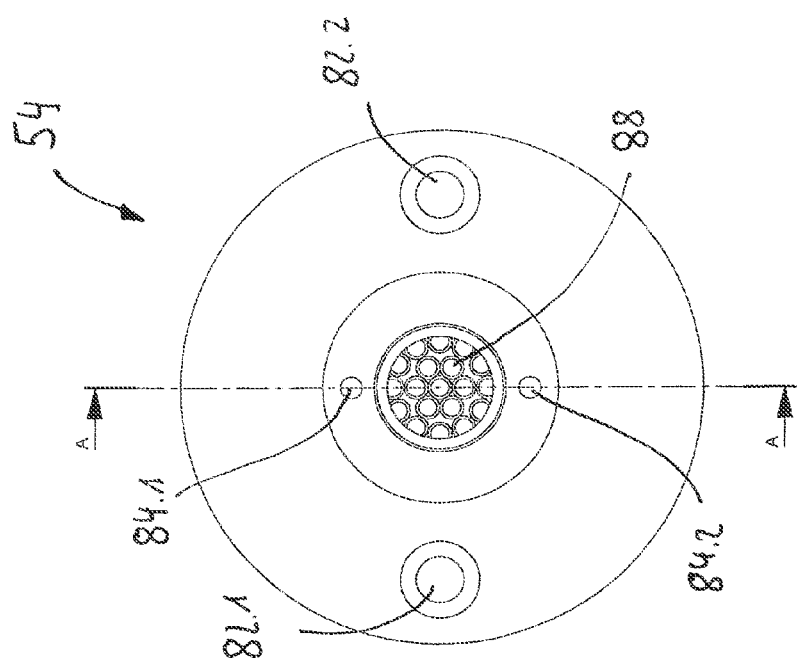

COMPOSITION FOR FILLING JOINTS AND/OR CRACKS

CROSS-REFERENCE TO RELATED APPLICATIONS

This application is a national stage of, and claims priority to, Patent Cooperation Treaty Patent Application No. PCT/EP2014/001036, filed on Apr. 17, 2014, which claims priority to German Application No. DE 10 2013 006 848.7, filed on Apr. 22, 2013, each of which applications are hereby incorporated herein by reference in their entireties.

BACKGROUND

The present disclosure relates to a composition for filling and sealing of joints and/or cracks, preferably in horizontal and/or vertical surfaces, preferably in concrete components and/or pavements, and a method for filling a joint and/or a crack.

Compositions for filling and sealing of joints and/or cracks are widely known. For example, compositions with bitumen are used as jointing material especially in roads, as bitumen is a relatively low-cost product of petroleum distillation which, due to its elastoplastic characteristics, is not only used as a binder in asphalt, but additionally, in an elastomer-modified, i.e., polymer-modified form, used as grout.

Grouts based on bitumen are used in particular as hot-poured compositions or in the form of bitumen joint tapes for filling horizontally arranged joints and/or cracks. These are addressed, in particular, in the "Additional Technical Contract Conditions and Guidelines for Joints in Traffic Areas, 2001 edition (ZTV Fug-StB 01)".

Generally, bitumen is characterized by a good resistance to aqueous acids and alkalis. Therefore, for example, asphalt surfaces, such as those in the field of LAU systems (facilities for the storage, filling and handling of water-hazardous substances), gas stations, or JGS systems (systems for air-tight storage and/or loading of fertilizer, especially slurry including artificial slurries, solid manure, liquid manure, animal excreta of non-agricultural origin, including material mixed with refuse or in processed form, liquid waste incurred by cell disruption or through exposure to compression during the manufacture or storage of silage (silage effluent) or silage or silage and fermented acid) such as silos, lagoons, silos, manure cellars and sewers, solid manure plates and loading areas, along with the associated pipelines, are built out of poured asphalt. For highly stressed surfaces, particularly LAU plants, but also JGS systems, there is a need for joint and crack filling materials, which are compatible with asphalt. For horizontal joints in this area, hot-poured bitumen fill compositions or bitumen joint tapes are typically used. For vertical joints, however, compositions based on polysulfides and/or polyurethanes are more commonly used.

For example in silos, which are often equipped with poured asphalt floors, problems persist with the connection of horizontal and vertical joints and vice versa due to the different materials which are used. Bitumen based fill compositions are often used for horizontal joints, whereas polysulfide-based or polyurethane-based materials are used for vertical joints. Due to the different material properties, particularly at contact points, such as the transition from a horizontal to a vertical joint, the materials used may have poor adhesion. Even worse, there may be an incompatibility between materials resulting in interactions, such as plasticizer migration with each other. The corresponding contact points thus represent weak points which do not fulfill the requirements of a sufficient seal against the leakage of environmentally hazardous fluids.

There is therefore a need for joint and crack filling material which solves this known problem from the prior art.

SUMMARY

Disclosed herein is a composition for filling of joints and/or cracks as well as a corresponding method through which the well-known disadvantages from the prior art, especially when connecting horizontal to vertical joints, can be avoided.

A composition for filling and backfilling of joints and/or cracks comprises:
- at least one bitumen in an amount in the range of approximately 30% by weight to about 75% by weight;
- at least one elastomer selected from a group consisting of styrene-butadiene copolymers, styrene-butadiene-Stryrol-(block) copolymers, styrene-isoprene-styrene (block) copolymers, styrene-isoprene (block) copolymers, synthetic and/or natural rubbers, in an amount in a range from about 2.5% by weight to about 22% by weight;
- at least one pulverized mineral filler in an amount in a range of about 12% by weight to about 35% by weight;
- at least one fibrous adjusting means for adjusting the resistance, selected from a group consisting of cellulose, glass fibers and/or plastic fibers, in an amount in a range from about 0.5% by weight to about 5% by weight; and at least one polymer prepared from an olefin and an α, β-unsaturated carboxylic acid and/or an α, β-unsaturated carboxylic acid anhydride, in an amount in a range from about 0.1% by weight to about 8% by weight, preferably to about 5% by weight, wherein the weight percentages are each based on the total amount of the composition.

To the extent that the term "about" is used in the present application with regard to ranges, in particular weight percentage ranges, or ranges of fiber lengths or thicknesses, it is to be understood that minimal deviations of the listed ranges outside the exact ranges that may be recited in the patent claims, do not extend outside of the ranges. In particular, deviations of +/−10 percent, preferably +/−5 percent, based on the respective indication of the term "about" covered.

To the extent used in the present application, the term "bitumen" is to be understood as a bitumen having a needle penetration at 25° C. in accordance with DIN EN 1426 (unit 0.1 mm) in a range of from about 80 to about 300, preferably in a range from about 140 to about 250, even more preferably in a range from about 160 to about 220. The use of bitumen which is suitable for road construction, in accordance with DIN 1995-1 is particularly preferred. Preferably, the composition of the disclosure comprises at least one bitumen in an amount in a range of about 40% by weight to about 65% by weight, more preferably in an amount of about 45% by weight to about 58% by weight, even more preferably in an amount in a range of about 42% by weight to about 56% by weight.

For the purposes of the present disclosure, the term "elastomer" refers to a polymer with elastomeric behavior, which, at room temperature can be repeatedly stretched to at least twice its length and, after removal of the tension required to stretch it, returns to approximately its initial length. It is preferred according to the present disclosure, that at least one elastomer is selected from a group consisting of styrene-butadiene copolymers, styrene-butadiene-styrene (block) copolymers, styrene-isoprene (block) copolymers, styrene-isoprene-styrene—(block) copolymers, butadiene rubbers, butyl rubbers, halogenated butyl rubbers, and halo/or natural rubbers. The at least one elastomer may be preferably added to the mixture in the form of a powder, more preferably in the form of a rubber powder. The grain size, at the time of adding the at least one elastomer to the mixture, is preferably in a range of greater of >0 mm to about 0.5 mm. When using the at least one elastomer in the form of a powder, this may advantageously be a mixture which may include different elastomers, and may further include, for example, natural rubbers, styrene-butadiene rubbers, styrene-isoprene-styrene copolymers, styrene-isoprene copolymers, butadiene—rubbers and/or butyl rubbers or halogenated rubbers are made. A styrene-isoprene-styrene copolymer is preferable to be used as the elastomer, especially if this is designed as a block copolymer, preferably in the form of a styrene-isoprene-styrene/styrene-isoprene block copolymer. Additionally, a mixture of a styrene-butadiene-styrene copolymers, optionally also block copolymers, and/or a styrene-isoprene-styrene copolymers or block copolymers in mixture with a powder which is a recycled material, preferably from automobile tires , and thereby a mixture of a natural rubber, a styrene-butadiene-rubber, a butadiene-rubber, and/or a halogenated butyl rubber may be advantageously used as the elastomer.

Preferred would be the at least one elastomer in an amount of about 2% by weight, preferably 5% by weight, to about 20% by weight, more preferably in an amount of about 8% by weight to about 16% by weight, still more preferably in an amount of about 11% by weight to about 15% by weight, is used in the composition of the disclosure, wherein the weight percentages are each based on the total amount of the composition. It is preferred that the composition of the disclosure includes the at least one elastomer, particularly designed as a styrene-isoprene-styrene (block) copolymer and/or styrene-butadiene styrene (block) copolymer, both in particular in the form of block copolymers, in an amount in a range from about 2.5% by weight to about 10% by weight, more preferably in an amount of about 5% by weight to about 9% by weight, and a further elastomer in the form of a powder, obtained as recycled material, preferably from automobile tires, comprehensively a mixture of different elastomers as mentioned above, in an amount of about 3% by weight to about 12% by weight, more preferably an amount of about 5% by weight to about 8% by weight.

The at least one powdery mineral filler according to the present disclosure is preferably selected from a group consisting of silicates, phosphates and/or sulfates. More preferably, the powdered mineral filler is a free carbonate. Preferred according to the present disclosure, the at least one powdery mineral filler is selected from a group consisting of magnesium silicates, in particular a talc. The at least one powdery mineral filler can be used in a mixture with for example a chlorite. More preferably, the at least one powdery mineral filler is present in an amount in a range of about 14% by weight to about 30% by weight, more preferably in an amount in a range of about 15% by weight to about 23% by weight, each based on the total amount of the composition of the disclosure.

The composition of the disclosure further preferably comprises at least one fibrous suspending agent, used to adjust the strength, particularly the creep strength. By means of this fibrous suspending agent, the processing consistency of the composition of the disclosure can be adjusted. In this case, the at least one fibrous actuating means is advantageously used in an amount in a range of about 1% by weight to about 4.5% by weight, more preferably in an amount in a range of about 1% by weight to about 6 3% by weight, in each case based on the total amount of the composition of the disclosure. Advantageously, the at least one fibrous suspending agents is selected from a group consisting of cellulose, glass fibers and/or plastic fibers, and particularly advantageously from a group consisting of cellulose fibers. The at least one suspending agent preferably has an average fiber length in a range from about 500 µm to about 1,500 µm, and more preferably has a fiber length in a range from about 800 µm to about 1,500 µm. More preferably, the at least one fibrous suspending agent has an average fiber thickness in a range from about 20 µm to about 80 µm, and more preferably In a range from about 30 µm to about 60 µm.

For the purposes of the present disclosure, the composition of the disclosure further comprises at least a polymer which is different from the at least one elastomer further described above, and is made of an olefin, and especially an α, β-unsaturated carboxylic acid and/or, especially, α, β-unsaturated carboxylic anhydride. This is advantageously in an amount in a range from about 0.5% by weight to about 2.8% by weight, more preferably about 0.8% by weight to about 2% by weight, still more preferably in an amount in a range from about 0.9% by weight to about 1.4% by weight contained in the composition of the disclosure, wherein the weight percentages are each based on the total amount of the composition of the disclosure. More preferably, the polymer is prepared from an olefin selected from a group consisting of ethylene and/or propylene or vinyl alcohol, and maleic acid anhydride. As an alternative to maleic anhydride, an acrylic acid, for example, may be used. Also ionomers of the above polymers can be used. Maleic anhydride copolymers or grafted polymers of maleic anhydride with propylene and/or ethylene are particularly preferable e to be used as polymers. The use of random copolymers having a content of maleic anhydride with a proportion of <50 Mol % as well as alternating copolymers with a maleic anhydride content of 50 Mol % is possible. Thereby, a large number of monomers of different structures can be used. Preferably, the at least one polymer is used in the form of pastilles having an average diameter in a range from about 7 mm to about 10 mm. The density of the polymers used, preferably the density of the maelic anhydride copolymers used, is in a range of about 0.90 g/cm$^3$ to about 0.935 g/cm$^3$ measured according to ISO 1183. Particularly preferred as the polymer according to the present disclosure, is an ethylene-maleic anhydride copolymer in the weight percent ranges mentioned above, preferably used as a random, but also as an alternating copolymer, and particularly preferably a grafted copolymer. The used polymer of ethylene and/or propylene and maleic anhydride or acrylic acid preferably has a Brookfield viscosity at a temperature of 140° C. in a range from about 400 to about 3000 mPa*s, more preferably in a range of about 500 mPa*s to about 2000 mPa*s. Preferably, the produced polymer from ethylene and/or propylene and maleic anhydride or acrylic acid, has a drop point according to ASTM D3954 in a range of about 85° C. to about 125° C., more preferably in a range from about 90° C. to about 115° C. as measured, for example, with a drop point analysis system DP70 of Mettler-Toledo A G, Schwerzenbach, Switzerland. The at least one polymer is advantageously used as a compatibilizer to allow in particular the inclusion of at least one fibrous stabilizing agent, and also the inclusion of the powdered mineral filler in the composition of the disclosure. In addition, the at least one polymer increases the melting point of the composition of the disclosure, or the viscosity of the composition reduced. With respect to these last two mentioned properties, the polymer used resembles thereby a wax used advantageously in the composition of the disclosure, whereby additional remarks will be made below.

More preferably, the composition of the disclosure may comprise at least one wax in an amount in a range from about 0.5% by weight to about 3% by weigh, more preferably in an amount in a range of about 1% by weigh to about 2% by weight, each based on the total amount of the composition of the disclosure. Particularly preferred is a wax is selected from a group consisting of Fischer-Tropsch waxes and/or Montan waxes. The at least one wax is advantageously used to increase the melting point of the composition of the disclosure or reducing the viscosity thereof.

The composition of the disclosure further comprises advantageously at least one plasticizer selected from the group consisting of aliphatic and/or naphthenic oils, in an amount in a range from about 5% by weight to about 15% by weight, more preferably in an amount in a the range of about 8% by weight to about 12% by weight, each based on the total amount of the mixture according to the disclosure. It is particularly preferred that the composition of the disclosure comprises at least one naphthenic process oil as plasticizer. The at least one plasticizer advantageously has a density at 25° C. in accordance with ISO 12185 in a range of about 0.89 kg/dm$^3$ to about 0.915 kg/dm$^3$. It advantageously has a viscosity at 40° C. according to ISO 3104 in a range of about 50 mm$^2$/s (cSt), preferably about 130 mm$^2$/s (cSt) to about 170 mm$^2$/s (cSt), preferably to about 155 mm$^2$/s (cSt).

The composition of the disclosure advantageously has a melting point according to DIN EN 1427 of greater than or equal about 85° C., more preferably greater than or equal about 90° C. More preferably, the composition of the disclosure demonstrates a cone penetration according to DIN EN 13880-2 at 25° C. in a range from about 40 to about 130 1/10 mm, more preferably in a range from about 50 to about 110 1/10 mm. More preferably, this has an elastic resilience according to DIN EN 12880-3 of less than or equal about 60%, more preferably less than or equal about 50%.

The composition of the disclosure has the advantage that it can be used, due to its high stability even at temperatures of up to about 70° C., in particular in the field of vertical joints and cracks. Due to its specific characteristics, the composition of the disclosure can be used in both horizontal and vertical surfaces, and accordingly at the connections between vertical joints and cracks and horizontal joints or cracks without exhibiting the known incompatibility problems of the prior art. Thus, the composition of the disclosure may be particularly advantageous in concrete structures or pavements that are exposed to aggressive materials, as is the case in LAU systems or in JGS systems, in vertical as well as horizontal applications. The composition of the disclosure can used in particular in joints and cracks in asphalt and concrete surfaces in which are driven over by utility vehicles such as tractors, trucks or cars. In addition, the composition of the disclosure is advantageously resistant to aggressive material even over extended time periods. Further, it is single component material and accordingly easy to work with. It is preferably heated or hot processed at temperatures in a range from about 90° C. to about 200° C., preferably in a range of about 100° C. to about 160° C.

Moreover, the composition of the disclosure also allows a good connection with connecting points to other bituminous grouts, since diffusion is possible both into and out from the composition of the disclosure, even after cooling. Joints and cracks can be also easily repaired, in particular maintenance joints, since the composition of the disclosure can be successfully applied on older bitumen joint material and can be easily reworked for example with a hot knife or spatula.

Furthermore, the composition of the disclosure may also comprise other conventional additives. In particular, the composition of the disclosure may include antioxidants, thermal stabilizers and other stabilizers. In the case of using an antioxidants, the amount of the antioxidant present in the composition should be in a range of about 0.05% by weight to about 0.8% by weight, preferably in an amount in a range of about 0.15% by weight to about 0.45% by weight, wherein the percentages by weight are based in each case on the total amount of the composition of the disclosure. As far as the composition of the disclosure thermal stabilizers and other stabilizers are present, these are preferably in an amount in a range from about 0.1% by weight to about 1% by weight, more preferably in an amount in a range of about 0.15% by weight to about 0.6% by weight, wherein the percentages by weight are based in each case on the total amount of the composition of the disclosure.

Preferably, the composition of the disclosure includes from about 45% by weight to about 60% by weight a bitumen having a needle penetration in a range of from about 160 to about 220; as an elastomer, at least one styrene-isoprene-styrene block copolymer in an amount in a range of about 5% by weight to about 10% by weight; a rubber powder, in particular as a recycled material in an amount in a range of about 4% by weight to about 10% by weight; at least one wax, in particular, a Montan wax, in an amount in a range of about 1% by weight to about 2% by weight; as fibrous stabilizer, cellulose, in particular cellulose having an average fiber length in a range from about 600 μm to about 1500 μm; in an amount in a range of about 1% by weight to about 4% by weight; at least one grafted polymer prepared from ethylene and/or propylene and maleic anhydride; in an amount in a range of about 0.5% by weight to about 5% by weight and a dropping point in a range of about 100° C. to about 120° C., measured according to ASTM D3954; at least one process oil as plasticizer in an amount in a range of about 5% by weight to about 16% by weight; a mineral filler talc in an amount in a range of about 13% by weight to about 22% by weight; and optionally other additives such as antioxidants, thermal stabilizers and other stabilizers in an amount in total in a range of 0.2% by weight to about 1% by weight; wherein percentages by weight as indicated above, are, in each case, based on the total amount of the composition.

The composition of the disclosure for filling of joints and/or cracks is preferably processed in combination with an bonding agent in the form of a primer and/or at least with a backfill profile. The present disclosure therefore also relates to a system consisting of the composition according to the disclosure for filling and sealing of joints and/or cracks as described above, as well as at least one coupling agent and/or at least one backfill profile. Preferably, exactly one bonding agent is used. The bonding agent serves to provide a better adhesion, especially in vertical joints or cracks, particularly on contact surfaces or concrete, poured asphalt, rolled asphalt, steel, stainless steel, but also on semi-rigid facings. Rigid cover layers are also referred to as semi-rigid coverings or mortar-filled cover layers. There are bituminous coverings with a bitumen-bound supports whose cavities are filled with a type of mortar.

The bonding agent may be formed in particular on the basis of a mixture comprising about 2% by weight to about 9% by weight of at least one styrene-isoprene polymer, particularly the block polymer, in particular triblock polymer, in particular with about 10% to about 20% styrene in the composition, about 16% by weight to about 40% by weight of at least one hydrocarbon resin, in particular a cyclic and/or linear aliphatic hydrocarbon resin, in particular having a melting point in a range of about 80° C. to about 110° C., and about 54% by weight to about 82% by weight of at least one solvent, in particular a linear or cyclic aliphatic and/or aromatic solvent, in particular petrol and/or xylene, and in particular having a density (20° C.) according to DIN 51757 in a range of about 0.67 to about 0.95 g/ml. More preferably, the bonding agent is formed from about 2% by weight to about 9% by weight of at least one styropolisoprene polymer as described above; from about 8% by weight to about 20% by weight a particular linear aliphatic hydrocarbon resin, preferably one a having a melting point in a range of about 90° C. to 110° C.; a cycloaliphatic hydrocarbon resin in an amount in a range of about 8% by weight to 20% by weight, preferably having a melting point in a range of about 80° C. to about 95° C.; about 50% to about 70% by weight gasoline as solvent with a density in a range from about 0.67 g/ml to about 0.77 g/ml at 20° C. according to DIN 51757, and about 4% by weight to about 12% by weight of xylene as the aromatic solvent.

Preferably, the mixture of the bonding agent comprises from about 4% by weight to about 6% by weight of at least one styrene-isoprene polymer as described above, about 10% by weight to about 15% by weight of at least one linear aliphatic particular hydrocarbon resin, about 10% by weight to about 5% by weight of at least one cycloaliphatic hydrocarbon resin as described above, about 58% by weight to about 65% by weight of at least one linear and/or cyclic aliphatic solvent, and about 5% by weight to about 9% by weight of at least one aromatic solvent, especially xylene. Alternatively, the bonding agent may also have a composition such as the adhesive layer described in EP 557 230 A2. The disclosure of EP 557 230 A2 is hereby fully incorporated in the present application, insofar as it concerns the design of the adhesive layer. In particular, the bonding agent in the sense of the present disclosure is thus one which includes bitumen and further includes styrene isoprene copolymers and/or styrene-butadiene block copolymers, aliphatic hydrocarbon resins, and mineral oil as well as filling material, in particular ground limestone or the like. Advantageously, the adhesive layer comprises at least one thermoplastic resin, in particular in the form of a hydrocarbon resin in an amount in a range of about 30% by weight to about 60% by weight, based on the total weight of the adhesive layer. The filling profile is used, in particular to prevent a three-sided adhesion. It prevents the formation of an adhesion of the composition on a joint or crack.

The present disclosure relates to the use of the composition, as described above, for filling of joints and/or cracks in horizontal and/or vertical surfaces, especially in concrete building components and/or pavements. Preferably, the composition of the disclosure is used in vertically oriented joints and/or cracks. Most preferably, the composition of the disclosure is used for filling of joints and/or cracks in LAU systems and/or JGS-systems, in particular for filling of joints and/or cracks in horizontal and/or vertical surfaces themselves, in particular, the relevant types of facilities and surfaces identified in the general description above, especially for mobile silo facilities.

Particularly preferred is the use of the composition according to the disclosure in mobile silo facilities.

The present disclosure further relates to a method for filling a gap and/or a crack with a composition of the disclosure, wherein the composition is heated and introduced by a caulking gun or a hand extruder into a joint or crack. For vertical joints or cracks, a cartridge pistol with a heated cartridge or heated composition which can be inserted into the cartridge is advantageously used. For horizontal joints and cracks other methods may be utilized as well, for example the use of hot casting heaters, particularly with a discharge lance and pumping equipment. The composition of the disclosure can also be applied by casting, discharge from a nozzle, force-feeding from a container of any kind or other known techniques. The heating of the composition in the caulking gun is preferably carried out in the disclosed process by inserting the caulking gun into a two- or multi-part heating block, which however, can also be designed as a single block with at least one heating cartridge or heating element inside. Alternatively, the heating of the loaded caulking pistol can be carried out in an electric or gas-fired furnace. If a heating block is used for the process, it is advantageous that at least two, preferably at least three, more preferably four caulking guns can accommodated. Advantageously, the heating block may be made of metal, further advantageously made of iron and/or aluminum or if appropriate, or alloys with particularly good heat transfer properties. The cartridges are filled with the composition in either a molten state, in the form of prefabricated bars or in granular form.

The viscoelastic composition of the disclosure, is advantageously a solid at room temperature (25° C.) resistant, and transitions into a pasty state at temperatures above 85° C. The dynamic viscosity, measured according to DIN EN 3702, is advantageously at a temperature of 85° C. in a range from about 55 Pa s to about 100 Pa s, and at a temperature of 100° C. in a range from about 25 Pa s to about 60 Pa s, the viscosity being measured at a shear rate of 20 $s^{-1}$.

The heating block advantageously includes an electrical control of the heating processes, which can, for example, take place through an electric generator or through another type of mobile power supply. Advantageously, the heating block includes, in an embodiment for receiving at least one caulking gun can receive two cartridges or rods; in an embodiment for at least two caulking guns, three cartridges or rods; in an embodiment for at least three caulking guns, four cartridges or bars; and in an embodiment, for at least four caulking guns, five cartridges or bars; which are located on both sides of the longitudinal sides of the caulking guns in the heating block. For this purpose, the heating block features channels or cavities through which cables for connecting the cartridge heaters can be laid and the cartridges or rods are receivable. Due to this design of the heating block, an advantageously uniform heating of the composition of the disclosure can be achieved. Following heating, the processing time for the composition is up to about 30 minutes, possibly even longer. In the case that the composition of the disclosure in the caulking gun becomes too cold, it can easily be re-inserted into the heating block.

As an alternative to using a heating block for heating the composition of the disclosure in a caulking gun, a hand extruder which has been heated can also be used for application of the composition. The hand extruder in this case includes advantageously one or more augers. The composition of the disclosure is preferably introduced in the form of bars, or as granules, into the hand extruder. Preferred is a continuous supply of the composition to the hand extruder by design of the composition in tape form.

Advantageously, according to the disclosed process, the composition is plasticized in a twin-screw extruder and heated prior to discharge into a caulking gun or a hand extruder. Here, in principle, a device may be provided as disclosed, for example, in EP 646 675 B1 0, where the relevant disclosure of which is hereby incorporated into the present disclosure. The composition, which is solid at ordinary ambient temperatures or processing temperatures, may thereby be added in the form of bars to the twin-screw extruder, optionally using other aids such as a roller press or the like, in particular a funnel, and then be plasticized, heated and discharged. The discharge is preferably carried out in a caulking gun, which is inserted into an opening of an adapter which is externally arranged in front of and extending from the extruder, with its dispensing tip so that then by the discharge of mass from the twin-screw extruder the cartridge gun is filled. The caulking gun is advantageously equipped with a reciprocating piston, which is heat-resistant, and is for example made of aluminum, and also includes a discharge element with a tip, also machined, for example from aluminum. The reciprocating piston advantageously includes, arranged at its endplate on the outer circumference, a ring seal which seals the piston against the inner wall of the cylindrical casing of the caulking gun.

Preferably, the twin screw extruder has a combined storage and blending compartment, which in addition to the two first recesses as storage for the twin screws of the twin-screw extruder, has a multitude of recesses around the aligned delivery openings, through which the composition is delivered. The storage and mixing section is so arranged below the two screws of the same in the conveying direction in the twin screw extruder and before the outlet nozzle the large number of passages a high level of homogenization of the plasticized and heated composition is achieved. Advantageously, the processing temperature of the composition of the disclosure during use of a caulking gun is in a range of about 85° C. to about 1 10° C., more preferably in a range of approximately 90° C. to about 100° C., referring to the temperature of the composition. If, for example, a hot casting heater is used, the processing temperature may also be in a range of about 150° C. to about 180° C.

SUMMARY OF THE DRAWINGS

These and other advantages of the present disclosure will be further illustrated by the following examples and figures. They show:

FIG. 5: a side view of a twin-screw extruder with attached caulking gun;

FIG. 6 is a sectional view according to the section A-A of FIG. 5;

FIG. 7 is a plan view of an extruder nozzle for the twin screw extruder as shown in FIGS. 5 and 6;

FIG. 8: a sectional view of the extruder according to FIG. 7 along the section A-A;

FIG. 9 is a perspective view of the extruder nozzle shown in FIGS. 7 and 8;

DESCRIPTION OF PREFERRED EMBODIMENTS

Figure 1:
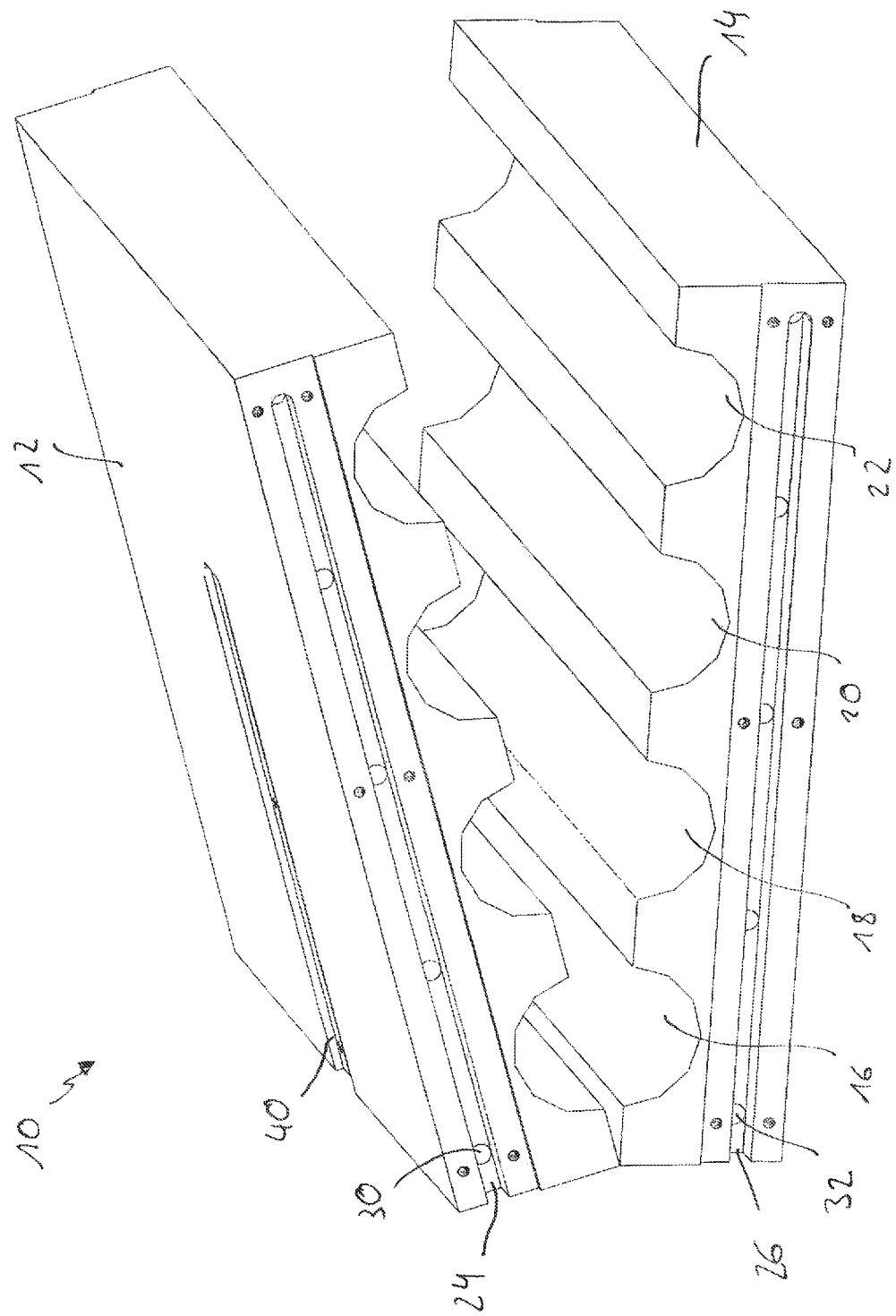
FIG. 1: a two-part heating block for carrying out a process according to the disclosure in a perspective view.

The embodiment shown in the figures of the two-part heater block as well as the composition of the exemplary composition described herein is not limiting. The heating block may be configured of one or more parts. Further, the features described herein can be combined together with those characteristics described above for further refinement. Additionally, it should also be noted that the reference numerals given in the description of the figures do not limit the scope of the present disclosure, but merely refer to the embodiments shown in figures. Same parts or parts with the same function have in the following to the same reference numerals.

FIG. 1 illustrates a two-part heating block 10 with an upper part 12 in a lower part 14. The upper part 12 has a receptacle 40 for mounting a temperature sensor, not shown here. A corresponding receptacle can also be provided at the bottom of the lower part 14. The upper part 12 and lower part 14 are formed symmetrically to each other. Both feature, on opposing longitudinal sides, channels 24 and 26, as well as channels 30 and 32, extending parallel along the traverse sides. The transverse channels 30 and 32 end approximately in the center in the upper part 12 and lower part 14, wherein opposite corresponding channels 30 and 32 are formed in a similar manner, on the, according to FIG. 1, rear longitudinal side.

The upper part 12 and lower part 14 can in this example be connected to one another on one side, for example, by conventional hinges, to allow for easier handling by allowing movement of the two parts 12 and 14 with respect to each other. Additionally, a handle may be provided on the upper part 12, as well as on the lower part 14, to further facilitate handling, wherein the handle may be advantageously arranged on the transverse side of the heater block 10 opposite the hinges.

The channels 24 and 26 serve to guide cables for heating cartridges for heating the caulking guns which are to be received in the receptacles 16, 18, 20 and 22. The heating block 10 can therefore absorb heat and a total of 4 caulking guns simultaneously. The heat is generated through heating cartridges arranged in the channels 30 or 32. This enables a very uniform heating of the composition added to the received caulking guns. This is inserted in the caulking guns advantageously in the form of bars or strips, or else in the form of granules.

Figure 2:
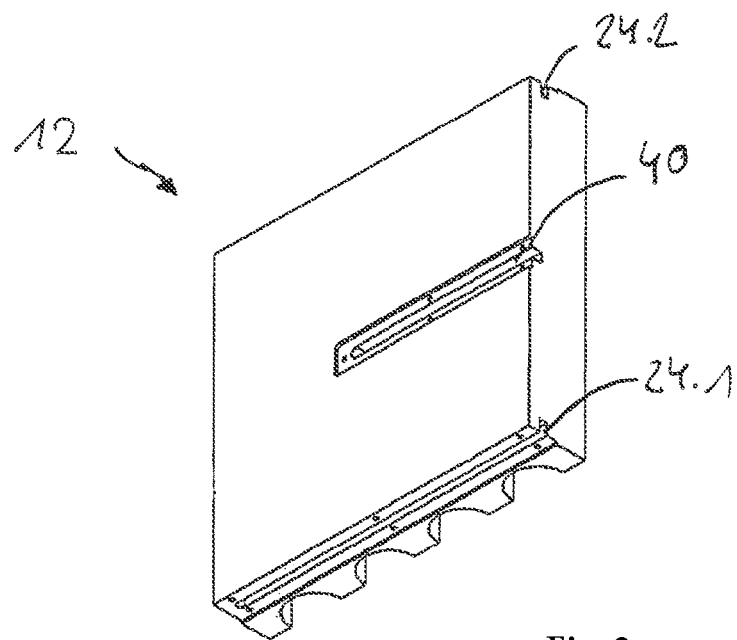
FIG. 2: a perspective view of the upper part of the two-part heating block in accordance with FIG. 1.

FIG. 2 shows a perspective view of the upper part 12 of the heater block 10 according to FIG. 1, from which in particular the configuration of the receptacle 40 can be seen better, as well as the arrangement of opposing channels 24.1 and 24.2 thereof on the long sides.

Figure 3:
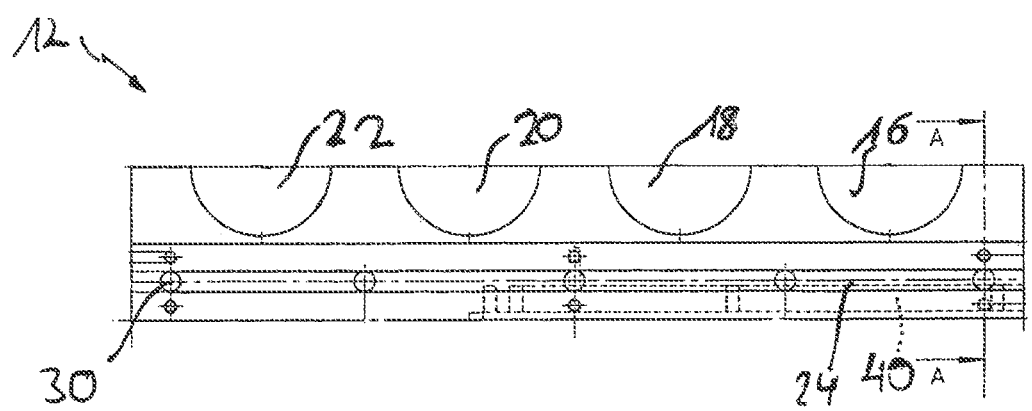
FIG. 3: a side view of the upper part of the two-part heating block of FIG. 1.

FIG. 3 shows a side view of the arrangement in particular of the channel 24 having a total of five passages 30 for cartridge heaters, which are arranged respectively left and right relative to the illustrated receptacles 16, 18, 20 and 22 in FIG. 3, in order to achieve a uniform warming of the caulking guns arranged in the receptacles 16, 18, 20 and 22 and of the composition.

Figure 4:
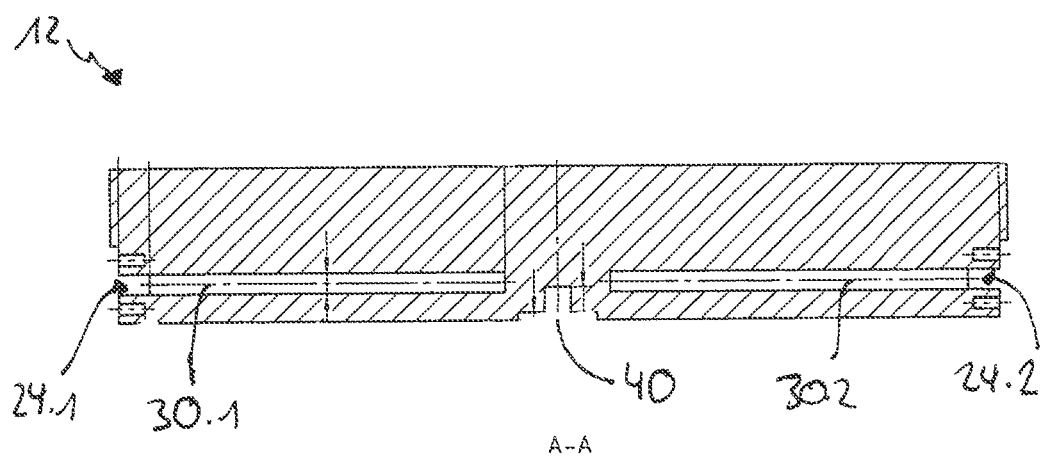
FIG. 4: a sectional view taken along section A-A through the side view according to FIG. 3 of the heating block.

FIG. 4 shows along a section A-A according to FIG. 3, the configuration of the opposing transverse channels 30.1 and 30.2, starting from the opposing sides of channels 24.1 and 24.2, as well as the design of the receptacle 40 including a central recess.

FIG. 5 shows a side view of a twin-screw extruder 50 with attached caulking gun 70, which can be used for the process according to the disclosure. The twin-screw extruder 50 has a housing 52 with a filling opening 53. Not shown in FIG. 5 is that the filling opening 53 may be connected, for example with a funnel and arranged with a rolling press inside, through which the bar shaped composition may be fed into the twin-screw extruder 50. The twin-screw extruder 50 further includes an extrusion nozzle 54 and an adapter 56, which includes an opening into which the outlet 74 can be inserted with a tip opening of the caulking gun 70 in order promote flow of the plasticized and warmed or heated disclosure-based composition into the caulking gun 70 by way of the twin-screw extruder 50.

FIG. 6 illustrates the twin-screw extruder 50 and the caulking gun 70 along a section A-A of FIG. 5. As can be seen, two screws 62 and 64 are arranged in the housing 52, along with a combined mixing and storage part 60. The mixing and storage part 60 forms recesses 66.1 and 66.2 which further engage with the ends of the screws 62 and 64 facing the extrusion nozzle 54. The recesses 66.1 and 66.2 are designed as a continuous bore and form bearing bushes for receiving the screws 62 and 64. However, the recesses 66.1 and 66.2 may be configured for example as blind-hole cavities or in any other form, to serve as a bearing for the screws 62, 64. The mixing and storage part 60 has a plurality of through-holes 68 (see FIGS. 10 and 11). The extruder nozzle 54 is arranged at the head of the housing 52, which is shown here, by way of example, with a central opening. Alternatively, the extruder nozzle 54 may be provided as described with respect to FIGS. 7 to 9. The extruder nozzle 54 has attached to it an adapter 56 with a central opening, into which the outlet 74 of the caulking gun 70, attached to the housing 72 thereof, may be inserted. The caulking gun 70 includes, in the interior of the housing 72, a reciprocating piston 76 with an annular end portion 78 which circumferentially has an annular seal 80 on its outer circumference. The outlet 74, the reciprocating piston 76 with end portion 78, and the housing 72 are preferably made of a heat-resistant material, for example a plastic or aluminum. The caulking gun 70 can be advantageously used in such a way that it is still surrounded by an insulating sleeve to prevent an immediate transfer of heat to the user's hands.

FIGS. 7 to 9 illustrate an extrusion nozzle 54, as can be alternatively used in the extruder according to FIGS. 5 and 6. This extrusion nozzle 54 has a central opening 86. In the direction of delivery, however, there are a plurality of circular passages 88, which may also be referred to as bore holes. A conical connecting part 89 connects an end of the circular passages 88 with an end of the central opening 86. The extruder nozzle case has openings 82.1 and 82.2 for mounting by means of screws on the housing of the twin-screw extruder 50, and blind holes 84.1 and 84.2 for attaching an adapter, as shown in FIGS. 5 and 6.

Figure 10:
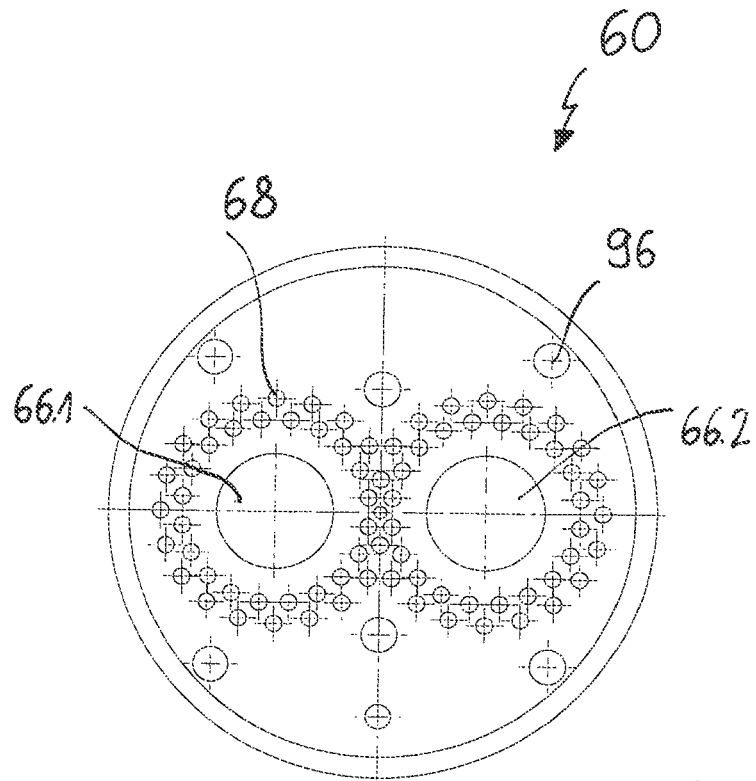
FIG. 10 is a plan view of a combined mixing and storage compartment of the twin-screw extruder as shown in FIGS. 5 and 6.
Figure 11:
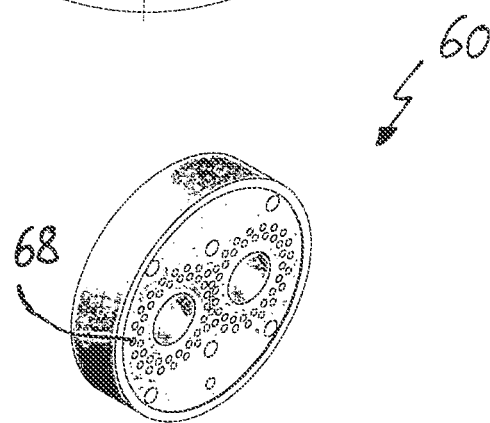
FIG. 11: a perspective view of the combined mixing and storing compartment of FIG. 10.

FIGS. 10 and 11 illustrate the mixing and storage part 60 in a plan view and a perspective view. In particular, the bearing recesses 66.1 and 66.2s, and a plurality of passage openings 68 arranged around the bearing recesses 66.1 and 66.2, can be seen.

A first exemplary composition is made of 54.5% by weight of a bitumen having a needle penetration at 25° C. according to DIN EN 1426 of about 160/0.1 mm to about 220/0.1 mm, wherein the composition further comprises 7% by weight of a styrene-isoprene-styrene/styrene-isoprene block copolymer, 6% by weight of a rubber flour made of a recycled material of rubber products, especially tires, with a particle size in a range of >0 mm to about 0, 5 mm, 1.5% by weight of Montan wax with a solidification point in the range from about 130 to about 150° C., 1% by weight of a grafted ethylene-maleic anhydride copolymers in the form of pellets, 10% by weight of a naphthenic process oil as plasticizer 18% by weight of talc as powdery mineral filler and 2% by weight of cellulose fibers, the cellulose fibers have an average fiber length of 1000 μm and average fiber thickness of 40 μm, wherein all indicated percentages by weight refer to the total amount of the mixture. A composition prepared as above exhibited at a temperature of 85° C. a dynamic viscosity, measured according to DIN EN 13702, measured at a shear rate of 20 s <−1> of 80 Pa s, at a temperature of 90° C. of 66 Pa s, at a temperature of 95° C. of 53 Pa s, and at a temperature of 100° C. of 43 Pa s.

Further exemplary compositions were prepared with different proportions of a grafted ethylene-maleic anhydride copolymers with a Brookfield viscosity of at 140° C. of 600 mPa s (cps) and a comparison with two ethylene (cps)—acrylic acid copolymers with a Brookfield viscosity of 575 to 140° C. mPa s (E) or 600 mPa s (cps) (F). The individual compositions are shown in the following table.

| Composition | Comparative Example A (% by weight) | Example B (% by weight) | Example C (% by weight) | Example D (% by weight) | Example E (% by weight) | Example F (% by weight) |
|---|---|---|---|---|---|---|
| Bitumen | 53.6 | 53.1 | 52.5 | 50.9 | 50.9 | 50.9 |
| Styrene isoprene styrene isoprene styrene block copolymer | 6.9 | 6.8 | 6.8 | 6.6 | 6.6 | 6.6 |
| Rubber granules | 5.9 | 5.9 | 5.8 | 5.6 | 5.6 | 5.6 |
| Montana wax | 1.48 | 1.5 | 1.45 | 1.4 | 1.4 | 1.4 |
| Cellulose fibers | 1.97 | 2 | 1.93 | 1.87 | 1.87 | 1.87 |
| Grafted ethylene maelic acid anhydride or acrylic acid copolymer | — | 1 | 2 | 5 | 5 | 5 |
| Plasticizer | 11.96 | 11.8 | 11.72 | 11.36 | 11.36 | 11.36 |
| Talcum | 17.6 | 17.5 | 17.3 | 16.72 | 16.72 | 16.72 |
| Antioxidant | 0.27 | 0.26 | 0.26 | 0.25 | 0.25 | 0.25 |
| Thermic stabilizer | 0.27 | 0.26 | 0.26 | 0.25 | 0.25 | 0.25 |
| Stabilizing agent | 0.05 | 0.05 | 0.05 | 0.05 | 0.05 | 0.05 |

In the comparative example A the use of ethylene maleic anhydride copolymers was forgone. The examples B to D include an increased percentage by weight of the same. All percentage by weight portions of the table are based on the total amount of composition defined there. A bitumen with a needle penetration at 25° C. according to DIN EN 1246 from about 160/0.1 mm to about 220/0.1 mm was used. The rubber powder was made of a recycled material from rubber products, in particular car tires, and had a particle size in a range from <0 mm to about 0.5 mm. The cellulose fibers used had an average fiber length of 1000 μm and an average fiber thickness of 40 μm. A process oil was used as a plasticizer. The talc used was used as a powdered mineral. Sterically hindered phenol compounds were used as the antioxidant, aromatic phosphate as the stabilizer, and a sterically hindered triazine as the thermic stabilizer. All substances mentioned were mixed together at about 190° C. for three hours and stirred. The compositions created in this way were placed in an experimental apparatus which consisted of a vertically arranged wall to which a U-shaped profile with a width of 2 cm, a depth of 3 cm and a length of 25 cm was mounted on its longitudinal side, wherein the U-profile was directed towards the floor and open at an angle of 90° C. towards a base plate. The U-shaped profile has been filled with the compositions A through D by a caulking gun and then the creep observed over a period of 16 hours to 63.5 hours at different temperatures. The summary results of the determination of the creep behavior are shown in the following table, where "nn" indicates "not determinable", since the composition flow was too large.

| Temperature load | Comparative Example A | Example B | Example C | Example D | Example E | Example F |
|---|---|---|---|---|---|---|
| 16 h 50° C. | about 5 mm | 0 mm | 0 mm | 0 mm | — | — |
| 16 h 50° C. + 2 h 70° C. | about 21 mm | about 5 mm | 0 mm | 0 mm | 0 mm | 1 mm |
| 16 h 50° C. + 4 h 70° C. | >50 mm | about 5 mm | 0 mm | 0 mm | 0 mm | 2 mm |
| 16 h 50° C. + 6.5 h 70° C. | >50 mm | about 5 mm | 0 mm | 0 mm | 0 mm | 2-3 mm |
| 16 h 50° C. + 24 h 70° C. | >50 mm | about 15 mm | 0 mm | 0 mm | about 1 mm | about 30 mm |
| 16 h 50° C. + 24 h 70° C. + 2 h 80° C. | n.d. | n.d. | 0 mm | 0 mm | 3-4 mm | >50 mm |
| 16 h 50° C. + 24 h 70° C. + 2 h 80° C. + 2 h 90° C. | n.d. | n.d. | about 20 mm | about 1 mm | >50 mm | >50 mm |
| 16 h 50° C. + 24 h 70° C. + 2 h 80° C. + 21.5 h 90° C. | n.d. | n.d. | >50 mm | about 1-2 mm | n.d. | n.d. |

As the table shows, the comparative composition A had an unacceptable creep, so that even with a lapse of 20 hours and an increase in temperature to 70° C. for 4 hours the composition moved more than 5 cm out of the U-Profile toward the floor. The composition B according to the disclosure demonstrated a movement of only 5 mm was under these conditions at 20 hours, and the compositions C and D showed no movement at all. The composition C began, only at a very high temperature load over a period of 44 hours with a gradual increase up to 90° C., to creep out from the filled U-profile towards the bottom of the experimental apparatus by 20 mm. The data for the compositions E and F were significantly worse than for the composition D, although the percentage by weight portions were the same, and worse than the composition C. Ethylene maleic anhydride copolymers thus demonstrate significantly improved properties as compared to ethylene-acrylic acid copolymers.

In contrast to hot poured compounds known the prior art, the above defined disclosed compositions have a silicate-containing as opposed to a carbonate-containing filler and, in particular cellulose fibers as a suspending agent, and, as a compatibilizer, an ethylene-maleic anhydride copolymer which enables the bonding of the fibrous suspending agent with the mixture.

The present disclosure is thus a composition which provides for filling of joints and/or cracks, especially in vertical joints and/or cracks, especially in concrete structures and road surfaces, and can be used, as well, in horizontally arranged joints and/or cracks, so that the known from the prior art problems do not arise. It is suitable both for new construction as well as repair.

The invention claimed is:

1. A composition for the filling of at least one of joints and cracks, comprising:
   at least one bitumen at a quantity in a range of about 30% by weight to about 75% by weight;
   at least one elastomer selected from a group consisting of styrene butadiene copolymers, styrene butadiene styrene (block) copolymers, styrene isoprene (block) copolymers, styrene isoprene styrene (block) copolymers, and synthetic and/or natural rubbers at a quantity in a range of about 2.5% by weight to about 22% by weight;
   at least one powdery mineral filler at a quantity in a range of about 12% by weight to about 35% by weight;
   at least one fibrous suspending agent to adjust firmness, selected from a group consisting of cellulose, glass fibers and plastic fibers at a quantity in a range of about 0.5% by weight to about 5% by weight; and
   at least one polymer made from an olefin and one α, β-unsaturated carbon acid and/or α, β-unsaturated carbon acid anhydride, at a quantity in a range of about 0.1% by weight to about 8% by weight.

2. The composition of claim 1, wherein the suspending agent displays an average fiber length in a range of about 500 μm to about 1,500 μm.

3. The composition of claim 1, wherein the suspending agent displays an average fiber thickness in a range of about 10 μm to about 100 μm.

4. The composition of claim 1, wherein the polymer created consists of an olefin selected from a group comprised of ethylene and/or propylene and maleic anhydride.

5. The composition of claim 1, wherein the composition comprises at least one elastomer selected from a group consisting of styrene butadiene copolymers, styrene butadiene styrene block copolymers, styrene isoprene styrene block polymers, styrene isoprene block polymers, butadiene rubber, butyl rubber, halogenated butyl rubber and natural rubber.

6. The composition of claim 1, wherein the composition further comprises at least one wax at a quantity in a range of about 0.5% by weight to about 3% by weight, referring to the total quantity of the mixture.

7. The composition of claim 1, wherein the composition further comprises at least one plasticizer selected from the group consisting of aliphatic and napthenic oils, at a quantity in a range of about 5% by weight to about 15% by weight.

8. The composition of claim 1, wherein the composition comprises at least one powdery mineral filler selected from a group consisting of silicates, sulfates, and phosphates.

9. A method, comprising filling at least one of joints and cracks in at least one of a horizontal and a vertical area with a composition, wherein the composition comprises:
- at least one bitumen at a quantity in a range of about 30% by weight to about 75% by weight;
- at least one elastomer selected from a group consisting of styrene butadiene copolymers, styrene butadiene styrene (block) copolymers, styrene isoprene (block) copolymers, styrene isoprene styrene (block) copolymers, and synthetic and/or natural rubbers at a quantity in a range of about 2.5% by weight to about 22% by weight;
- at least one powdery mineral filler at a quantity in a range of about 12% by weight to about 35% by weight;
- at least one fibrous suspending agent to adjust firmness, selected from a group consisting of cellulose, glass fibers and plastic fibers at a quantity in a range of about 0.5% by weight to about 5% by weight; and
- at least one polymer made from an olefin and one $\alpha$, $\beta$-unsaturated carbon acid and/or $\alpha,\beta$-unsaturated carbon acid anhydride, at a quantity in a range of about 0.1% by weight to about 8% by weight.

10. The method of claim 9, wherein the composition is filled into at least one of joints and cracks that is vertically oriented.

11. The method of claim 9, further comprising using the composition in at least one of a facility for the storage, filling and handling of water-hazardous substances, and a facility for at least one of storage and loading of fertilizer.

12. A method of filling of at least one of joints and cracks with a composition, the method comprising heating the composition inserting the composition into one of a joint and a crack with one of a caulking gun and a hand extruder, wherein the composition comprises
- at least one bitumen at a quantity in a range of about 30% by weight to about 75% by weight;
- at least one elastomer selected from a group consisting of styrene butadiene copolymers, styrene butadiene styrene (block) copolymers, styrene isoprene (block) copolymers, styrene isoprene styrene (block) copolymers, and synthetic and/or natural rubbers at a quantity in the range of about 2.5% by weight to about 22% by weight;
- at least one powdery mineral filler at a quantity in a range of about 12% by weight to about 35% by weight;
- at least one fibrous suspending agent to adjust firmness, selected from a group consisting of cellulose, glass fibers and plastic fibers at a quantity in a range of about 0.5% by weight to about 5% by weight; and
- at least one polymer made from an olefin and one $\alpha$, $\beta$-unsaturated carbon acid and/or $\alpha,\beta$-unsaturated carbon acid anhydride, at a quantity in a range of about 0.1% by weight to about 8% by weight.

13. The method of claim 12, the composition is heated inside the caulking gun through insertion of the caulking gun into a heating block including at least one heating cartridge arranged within the heating block.

14. The method of claim 12, wherein the composition is plasticized and heated in a twin-screw extruder prior to placement into a caulking gun or a hand extruder.

15. The method of claim 14, wherein the twin-screw extruder presents a mixing and storage part, which in addition to two initial recesses as storage for screws of the twin screw extruder presents a multitude of passage openings arranged around the recesses, through which the composition is fed.

16. The method of claim 14, wherein the caulking gun encompasses the discharge medium, which is inserted into an opening of an adapter or the twin-screw extruder, to transfer the plasticized and heated mixture from the twin-screw extruder into the caulking gun.

* * * * *